W. PALMER.
Car Starter.

No. 11,759.  
Patented Oct. 3, 1854.

UNITED STATES PATENT OFFICE.

WM. PALMER, OF NEW YORK, N. Y.

APPARATUS FOR STARTING RAILROAD-CARS.

Specification of Letters Patent No. 11,759, dated October 3, 1854.

*To all whom it may concern:*

Be it known that I, WM. PALMER, of the city, county, and State of New York, have invented a new and useful Mode of Starting Railroad-Cars, which I term "The Double-Leverage Mode of Starting Railroad-Cars," and do hereby declare the following to be a full and exact description thereof, reference being had to the annexed drawings, making a part of this specification.

The same letters refer to the same parts wherever they occur.

Figure 1:
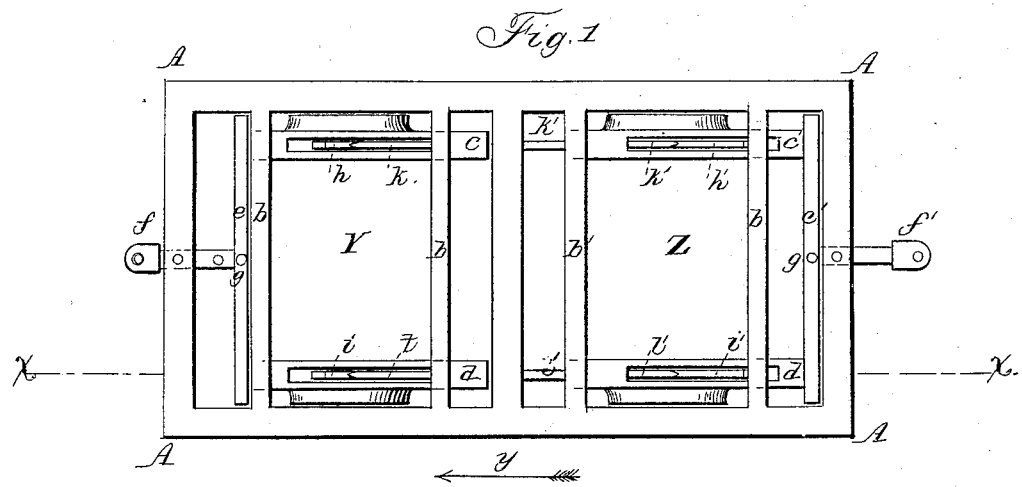
Figure 2:
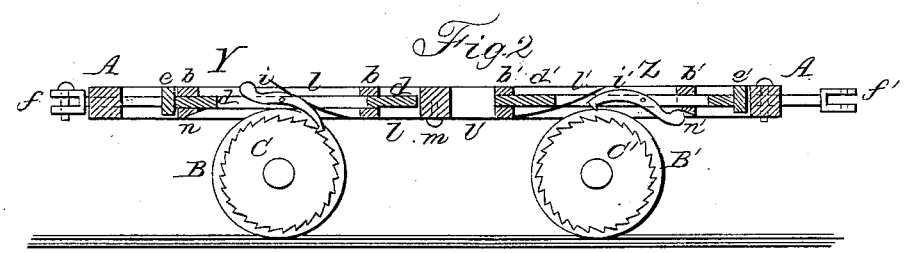
Figure 3:
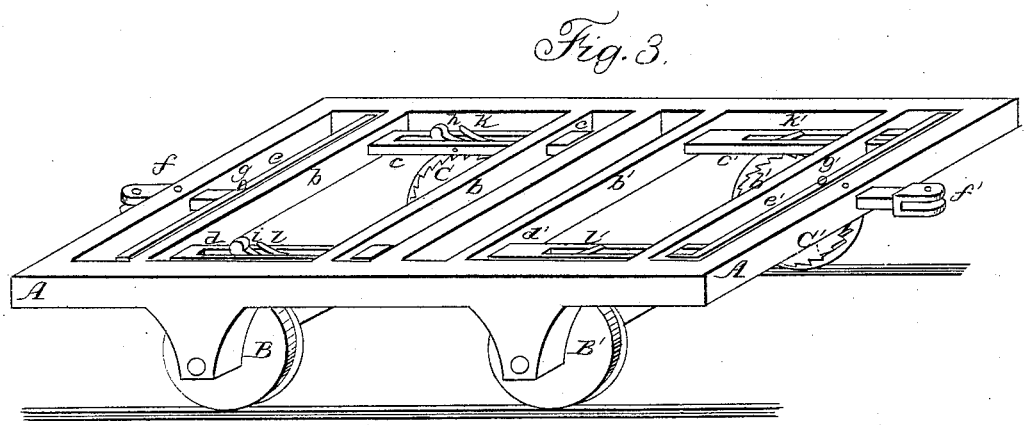

In my drawings, Figure 1, is a ground plan of the car frame. Fig. 2, is a vertical section of the same, through line X, X, in Fig. 1. Fig. 3, is a perspective view of car frame wheel etc.

The nature of my invention consists in providing the wheels of the car with a spur or cog wheel nearly as large in diameter as the rim of the car wheel, to the top of which the propelling power furnished by horses or a locomotive is applied, instead of applying the same to the axletree which heretofore has been the only mode of drawing any kind of carriage. It is evident that, if the spur or cog wheel is as large as the car wheel, or nearly so, the propelling power acts in this case on the end of a lever as long as the diameter of the car wheel; while in the other case when the power is applied in the ordinary way to the axletree, the power acts by a lever as long as the radius of the car wheel. Consequently the leverage is as long again when the power is applied to the top of the wheel; and only one half of the power is required to start the car, that would be in the ordinary way of propelling cars. After the car has been started the propelling power ceases to act upon the spur or cog wheel, and the car is drawn the usual way. In order to explain the manner in which I accomplish this I will proceed to give a description of my drawings.

A, represents the car frame. B, B$^1$ the car wheels. C, C$^1$ spur or cog wheels, cast on, or cast in parts and bolted or riveted to the car wheels. Over each of these spur or cog wheels C C$^1$ and as near to them as possible there is a horizontal bar $c$, $d$, $c^1$, $d^1$, which slides in a longwise direction in holes of crossbars $b$ $b^1$ of car frame A, A. Each pair of these bars $c$, $d$ and $c^1$ $d^1$ is united at their forward head with a connecting bar $e$ $e^1$, so that $c$ $d$ and $e$ on one side, and $c^1$ $d^1$ and $e^1$ on the other side form two firm draw frames which slide in those holes of cross bars $b$, $b^1$. To these sliding frames are attached the couplings $f$, $f^1$, which pass loosely through slots in frame A into mortised holes in connecting bars $e$, $e^1$, and are fastened to these by means of pins $g$, $g^1$.

The sliding bars $c$ $d$ $c^1$ $d^1$ are provided with slots for the purpose of receiving the hooks $h$, $i$ $h^1$, $i^1$, which work the spur or cog wheel and are pressed into gear by means of springs $k$, $l$, $k^1$, $l^1$. These springs are fastened to car frame A by a screw $m$.

The operation of this arrangement will be as follows. When the car is to be stopped the horses are checked, or the steam shut off, when a locomotive propels the car, in both cases the velocity of the car will cause the car to press against the propelling power, and as this power is attached to the coupling $f$, when the car is being moved in the direction of the arrow $y$, this coupling and consequently the sliding frame $c$, $e$, $d$ with its hooks $h$, $i$ will move back as far as it can, and take the position in which it is shown in the drawings at side Y of the car. The springs $k$ and $l$ will force hooks $h$, $i$ into the teeth of wheels C. In this position the hooks $h$, $i$ are ready to take effect as soon as the car is to be started again. When the power is applied to the coupling $f$, it will first move the draw frame $c$, $e$, $d$ out and consequently the hooks, $h$, $i$ will pull the car wheels by means of the spur or cog wheels until the draw frame $c$, $e$, $d$ comes to a stop by coming in contact with the car frame, when the purpose of starting the car is accomplished. After this the propelling power operates upon the car in the ordinary way. Before the draw frame $c$, $e$, $d$ comes to a stop in its forward motion the hooks $h$, $i$ are thrown out of gear by means of an incline $n$, which is placed so that when the back end of the hooks $h$, $i$, strikes it the head of them is lifted out of the teeth of wheels C. This is necessary for two purposes, first, to prevent the noise that would be caused by the hooks rubbing on the periphery of the spur or cog wheels when the car is in motion, and secondly, when the car is propelled in direction of arrow $y$, the hind wheels C$^1$ would not be able to turn if hooks $h^1$, $i^1$ were in gear with the spur or cog wheel C$^1$. To accomplish this the draw frame $c^1$ $e^1$ $d^1$ must be drawn out as is shown in the figures at side Z of the car, when hooks $h^1$ $i^1$ are out of gear by means of incline $n^1$ and fixed in that position which can be done by dropping the pin of the coupling $f^1$ into the hole in car frame A and a corresponding one in shank of coupling of $f$.

Having given a description of my invention I will proceed to state what I claim and desire to secure by Letters Patent of the United States.

What I claim as my invention and desire to secure by Letters Patent, is—

The apparatus for starting cars herein set forth, consisting of the ratchet wheels $c$ attached to the car wheels, acted upon by the spring pawls $i$, $h$, situated within the slotted bars $c$, $d$, which are connected by suitable frame work with the draw-bar $f$, the whole being so arranged that on starting, the traction of the said draft-bar shall be directly upon the top part of the wheels, until the pawls are thrown out of gear—and on stopping the car, the draft bar shall be pushed back hereby setting the pawls for starting again, substantially as above described.

WILLIAM PALMER.

Witnesses:
G. G. TAYLOR,
H. W. FISHER.